United States Patent [19]

Smith et al.

[11] Patent Number: 4,930,046
[45] Date of Patent: May 29, 1990

[54] APPARATUS BY WHICH AUXILIARY SLIDE-IN UNITS ARE CONNECTED TO SLIDE-IN UNITS

[75] Inventors: Raymond D. Smith, Reading; Robert Marles, Berkshire, both of England

[73] Assignee: GEC Plessey Telecommunications Limited, England

[21] Appl. No.: 260,270

[22] Filed: Oct. 20, 1988

[30] Foreign Application Priority Data

Oct. 20, 1987 [GB] United Kingdom ................. 8724523

[51] Int. Cl.⁵ .............................................. H05K 1/14
[52] U.S. Cl. ..................................... 361/393; 379/329
[58] Field of Search ............................ 379/326–329; 361/412, 413, 415, 391–394; 439/55, 59–62

[56] References Cited

U.S. PATENT DOCUMENTS

| | | | |
|---|---|---|---|
| 4,337,499 | 6/1982 | Cronin et al. | 361/413 |
| 4,511,950 | 4/1985 | Bunner et al. | 361/412 |
| 4,658,333 | 4/1987 | Grimes | 379/328 |

Primary Examiner—Neil Abrams

[57] ABSTRACT

A plurality of slide-in unit connectors are provided for receiving the slide-in units or the auxiliary slide-in units. The slide-in unit connectors are wired to at least three cable connectors in such manner that when a first cable connector only is used, each slide-in unit connector is connected to receive a respective slide-in unit, when a second cable connector only is used, one of the slide-in unit connectors is connected to receive an auxiliary slide-in unit; and when a third cable connector only is used, two of the slide-in unit connectors are connected to receive in tandem a respective auxiliary slide-in unit.

6 Claims, 1 Drawing Sheet

APPARATUS BY WHICH AUXILIARY SLIDE-IN UNITS ARE CONNECTED TO SLIDE-IN UNITS

FIELD OF THE INVENTION

The present invention relates to apparatus by which auxiliary slide-in units are connected to slide-in units.

The invention finds application in a telecommunications environment such as exchanges known as System X and is particularly applicable to the line shelf on the digital subscriber switching subsystem of such exchanges, where auxiliary slide-in units are connected to subscriber line units (SLU's). Such units are in the form of a plug-in cards.

DESCRIPTION OF THE PRIOR ART

A previous way of making such connections is to have the auxiliary units and their respective controllers in separate shelves. Cables are used to connect the inputs and outputs of the auxiliary units to the main distribution frame (MDF).

A disadvantage of this type of connection, is that if a subscriber requests an auxiliary function, patching cables are changed on the MDF to put the appropriate auxiliary in series with the subscriber line unit (SLU).

SUMMARY OF THE INVENTION

The present invention overcomes the disadvantage by providing a plurality of MDF cable sockets on the shelf wired up to slide-in unit connectors in a manner that permits various auxiliary connections, dependent upon which socket the MDF cables are inserted.

The present invention also has the advantage that where the subscriber line units and the auxiliary units can be accommodated on the same line shelf they can be driven by a common controller.

STATEMENT OF THE OBJECTS OF INVENTION

An aim of the present invention is to provide a means of connecting slide-in units with auxiliary slide-in units in a cost effective manner which does not suffer from the above disadvantage.

According to the present invention, there is provided apparatus by which auxiliary slide-in units are connected to slide-in units, wherein a plurality of slide-in unit connectors are provided for receiving the slide-in units or the auxiliary slide-in units, said slidein units connectors being wired to at least three cable connectors in such manner that when a first cable connector only is used, each slide-in unit connector is wired to receive a respective slide-in unit, when a second cable connector only is used, one of the slide-in unit connectors is wired to receive an auxiliary slide-in unit; and when a third cable connector only is used, two of the slide-in connectors are wired to receive in tandem a respective auxiliary slide-in unit.

BRIEF DESCRIPTION OF THE DRAWING

An embodiment of the present invention will now be described with reference to the accompanying drawings wherein.

DESCRIPTION OF THE PREFERRED EMBODIMENT

Figure 1:
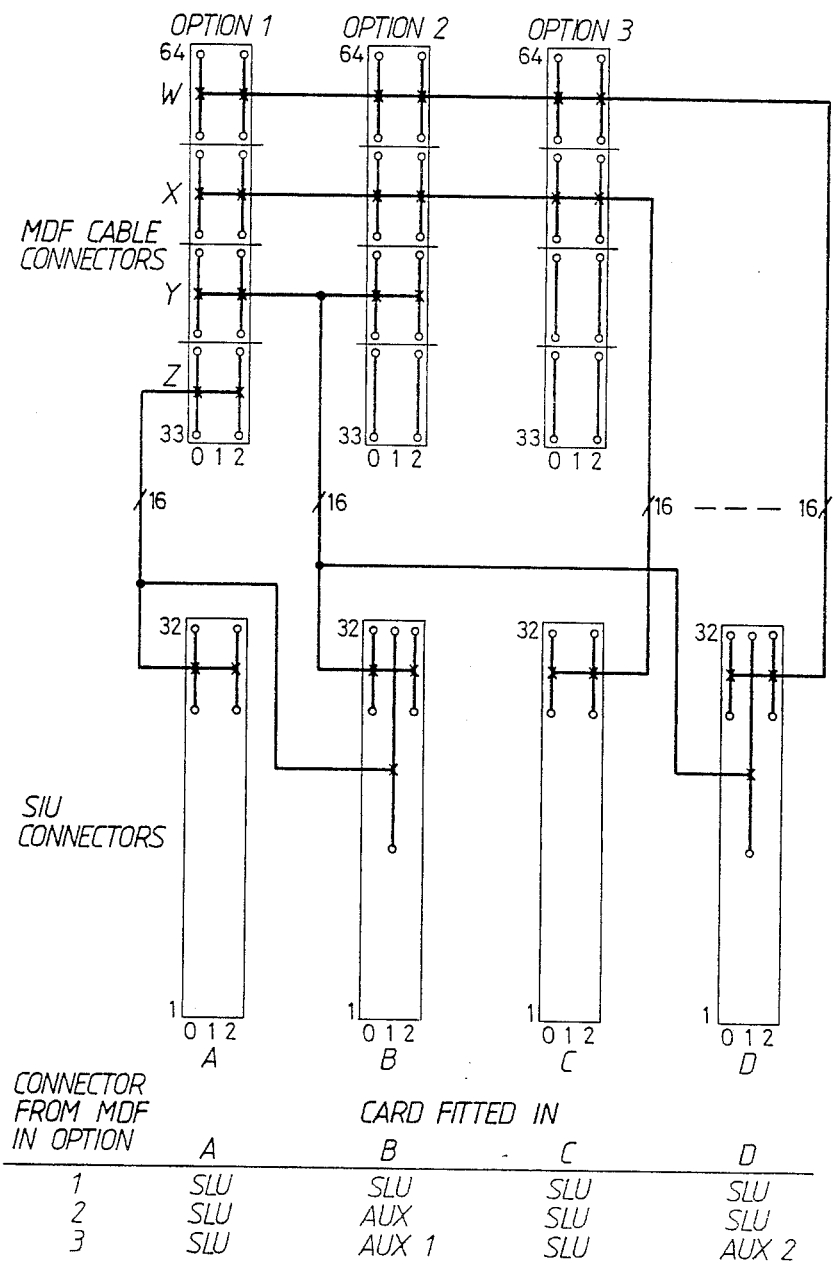
FIG. 1 shows the interconnection of MDF cable connectors to slide-in unit connectors as viewed from the slide-in unit side of a shelf, together with a table showing three options and the auxiliary connections obtained.

Referring to FIG. 1, three MDF cable connectors are shown, and identified as Option 1, Option 2 and Option 3. Each connector has four sections W, X, Y and Z. The W and X sections are strapped across in all options, the Y section is strapped across Options 1 and 2 only, and the Z section is used only in Option 1.

Four slide-in unit connectors A, B, C and D are connected such that the Z section of Option 1 is strapped to connectors A and B, the Y sections of Options 1 and 2 are strapped to connectors B and D, the X sections of Options 1, 2 and 3 are strapped to connector C; and the W sections of Options 1, 2 and 3 are strapped to connector D.

Each connector is provided with three rows of pins designated 1-32, 33-64. The drawing shows schematically that each pin is connected to a corresponding pin by a wire connection and reference/16 indicates that sixteen such connections are provided.

The above connections result in the following options as shown in the table of FIG. 1.

When the first MDF cable connector is used as per Option 1, the slide-in unit connectors A, B, C and D are wired to receive subscriber line units.

When the second MDF cable connector is used as per Option 2, the slide-in unit connectors A, C and D are wired to receive subscriber line units; and the slide-in unit connector B is wired to receive an auxiliary unit.

When the third MDF cable connector is used as per Option 3, the slide-in unit connectors A and C are wired to receive subscriber line units; and the slide unit connectors B and D are wired to receive auxiliary units in tandem i.e. in series.

The above description is not intended to limit the scope of the present invention. The embodiment as discussed does not permit more than two auxiliary unit cards to be connected in tandem, however it will be readily appreciated by those skilled in the art, that more auxiliary positions could be provided by adding further MDF plug up socket positions.

We claim:

1. Apparatus by which auxiliary subscriber slide-in units are connected to subscriber slide-in units, wherein a plurality of subscriber slide-in unit connectors are provided for receiving the subscriber slide-in units or the auxiliary subscriber slide-in units, said subscriber slide-in unit connectors being connected to at least three cable connectors in such manner that when a first one of said cable connectors only is used, each subscriber slide-in unit connector is connected to receive a respective subscriber slide-in unit, when a second one of said cable connectors only is used, one of the subscriber slide-in unit connectors is connected to receive an auxiliary subscriber slide-in unit and the remaining subscriber slide-in unit connectors are connected to receive a respective subscriber slide-in unit; and when a third one of said cable connectors only is used, two of the subscriber slide-in unit connectors are connected to receive in series a respective auxiliary subscriber slide-in unit connectors are connected to receive a respective subscriber slide-in unit.

2. Apparatus as claimed in claim 1, wherein the first, second and third cable connectors are main distribution frame cable sockets, each having first, second, third and fourth sections.

3. Apparatus as claimed in claim 2, wherein the fourth section of the first cable socket is connected to first and second subscriber slide-in unit connectors.

4. Apparatus as claimed in claim 3, wherein the third section of the first and second cable sockets are connected with each other and are further connected to second and fourth subscriber slide-in unit connectors.

5. Apparatus as claimed in claim 4, wherein the second section of the first, second and third cable sockets are connected with each other and are further connected to the third subscriber slide-in unit connector.

6. Apparatus as claimed in claim 5, wherein the first, section of the first, second and third cable sockets are connected with each other and are further connected to the fourth subscriber slide-in unit connector.

* * * * *